US012651392B2

(12) United States Patent
Wang et al.

(10) Patent No.: US 12,651,392 B2
(45) Date of Patent: Jun. 9, 2026

(54) STATIONARY MULTI-SOURCE AI-POWERED TOMOGRAPHY (SMART) IMAGE RECONSTRUCTION METHOD AND APPARATUS

(71) Applicant: Rensselaer Polytechnic Institute, Troy, NY (US)

(72) Inventors: Ge Wang, Loudonville, NY (US); Weiwen Wu, Troy, NY (US); Yan Xi, Songjiang Qu (CN)

(73) Assignee: Rensselaer Polytechnic Institute, Troy, NY (US)

( * ) Notice: Subject to any disclaimer, the term of this patent is extended or adjusted under 35 U.S.C. 154(b) by 317 days.

(21) Appl. No.: 18/238,605

(22) Filed: Aug. 28, 2023

(65) Prior Publication Data

US 2024/0070938 A1    Feb. 29, 2024

Related U.S. Application Data

(60) Provisional application No. 63/401,216, filed on Aug. 26, 2022.

(51) Int. Cl.
*G06T 12/10*        (2026.01)
*G06T 12/30*        (2026.01)

(52) U.S. Cl.
CPC .............. *G06T 12/30* (2026.01); *G06T 12/10* (2026.01); *G06T 2211/412* (2013.01); *G06T 2211/428* (2013.01); *G06T 2211/441* (2023.08)

(58) Field of Classification Search
CPC .... G06T 11/003; G06T 11/005; G06T 11/008; G06T 2211/00; G06T 2211/412;
(Continued)

(56) References Cited

U.S. PATENT DOCUMENTS 6,324,243 B1 * 11/2001 Edic ....................... A61B 6/469
                                                            378/4
7,916,828 B1     3/2011 Khare et al.
(Continued)

OTHER PUBLICATIONS

Kowtal et al., Signal Sensing and Reconstruction Paradigms for a Novel Multi-Source Static Computed Tomography System, ICASSP 2020—2020 IEEE International Conference on Acoustics, Speech and Signal Processing (ICASSP), Barcelona, Spain, 2020, pp. 9274-9278, doi: 10.1109/ICASSP40776.2020.9054146.*
(Continued)

*Primary Examiner* — Guillermo M Rivera-Martinez
(74) *Attorney, Agent, or Firm* — Barclay Damon LLP; Anthony P. Gangemi

(57)                ABSTRACT

In one embodiment, there is provided a dynamic multi-source image reconstruction apparatus. The apparatus includes a first reconstruction stage, a second reconstruction stage, and a refinement stage. The first reconstruction stage is configured to receive an input data set including a group of data frames. Each data frame corresponds to a respective time step. Each data frame includes a number of projection data sets. Each projection data set corresponds to a respective source-detector pair of a stationary multi-source tomography system. The first reconstruction stage is further configured to reconstruct a first intermediate image based, at least in part, on the group of data frames. The second reconstruction stage is configured to receive a selected data frame and to reconstruct a second intermediate image with a constraint of the first intermediate image as prior. The refinement stage is configured to refine the second intermediate image to produce a three-dimensional output image.

20 Claims, 4 Drawing Sheets

(58) Field of Classification Search

CPC ....... G06T 2211/441; G06T 5/00; G06T 5/60; G06T 15/00; G06V 10/82; G06V 2201/031; G06V 10/20

See application file for complete search history.

(56) References Cited

U.S. PATENT DOCUMENTS

| | | | |
|---|---|---|---|
| 8,189,735 B2 | 5/2012 | Khare et al. | |
| 8,204,172 B1 | 6/2012 | Hsieh et al. | |
| 8,472,688 B2 | 6/2013 | Samsonov et al. | |
| 9,107,642 B2 | 8/2015 | Funk et al. | |
| 9,129,425 B2 | 9/2015 | Myers et al. | |
| 9,235,907 B2 | 1/2016 | Ramirez Giraldo et al. | |
| 9,468,409 B2 | 10/2016 | Claus et al. | |
| 9,734,432 B2 | 8/2017 | Griswold et al. | |
| 9,734,601 B2 | 8/2017 | Bresler et al. | |
| 10,302,491 B2 | 5/2019 | Gensemer et al. | |
| 10,462,447 B1 | 10/2019 | Kohle et al. | |
| 10,985,777 B2 | 4/2021 | Baraniuk et al. | |
| 2004/0017881 A1* | 1/2004 | Cesmeli | G06T 11/005 |
| | | | 378/4 |
| 2004/0062342 A1* | 4/2004 | Cahill | G01N 23/046 |
| | | | 378/4 |
| 2007/0010731 A1* | 1/2007 | Mistretta | A61B 6/037 |
| | | | 600/407 |
| 2009/0161932 A1* | 6/2009 | Chen | G06T 11/006 |
| | | | 382/131 |
| 2011/0052023 A1 | 3/2011 | Garg et al. | |
| 2012/0087464 A1 | 4/2012 | McCroskey et al. | |
| 2013/0343629 A1* | 12/2013 | Myers | G06T 11/003 |
| | | | 382/131 |
| 2015/0282774 A1* | 10/2015 | Lee | A61B 6/032 |
| | | | 378/8 |
| 2016/0106382 A1* | 4/2016 | Lu | A61B 6/541 |
| | | | 600/428 |
| 2017/0196522 A1* | 7/2017 | Gupta | A61B 6/4007 |
| 2017/0330354 A1 | 11/2017 | Leng et al. | |
| 2019/0076103 A1* | 3/2019 | Mistretta | A61B 6/465 |
| 2019/0369190 A1 | 12/2019 | Ye et al. | |
| 2020/0170590 A1 | 6/2020 | Gagnon et al. | |
| 2021/0019923 A1 | 1/2021 | Huang | |

OTHER PUBLICATIONS

Gong et al., X-ray scatter correction for multi-source interior computed tomography, Med Phys, Jan. 2017; 44(1), pp. 71-83, doi: 10.1002/mp.12022, PMID: 28102959.*

Chen et al., Prior image constrained compressed sensing (PICCS): a method to accurately reconstruct dynamic CT images from highly undersampled projection data sets, Med Phys, Feb. 2008, 35(2), pp. 660-663, doi: 10.1118/1.2836423, PMID: 1838368, PMCID: PMC2655145.*

Burger et al., A variational reconstruction method for undersampled dynamic x-ray tomography based on physical motion models, Inverse Problems, vol. 33, No. 12, 124008 (2017), 2017, pp. 1-24, doi.org/10.1088/1361-6420/aa99cf.*

* cited by examiner

600

STATIONARY MULTI-SOURCE AI-POWERED TOMOGRAPHY (SMART) IMAGE RECONSTRUCTION METHOD AND APPARATUS

CROSS REFERENCE TO RELATED APPLICATION(S)

This application claims the benefit of U.S. Provisional Application No. 63/401,216, filed Aug. 26, 2022,which is incorporated by reference as if disclosed herein in its entirety.

FIELD

The present disclosure relates to tomography, in particular to, stationary multi-source artificial intelligence (AI)-powered real-time tomography.

BACKGROUND

Computed tomography (CT) is used to perform diagnostic tasks in clinical and preclinical settings. A conventional CT system is typically equipped with one or two source-detector assemblies that may provide a sub-optimal temporal resolution. Temporal resolution may be improved by, for example, increasing rotation speed, utilizing two tube-detector pairs, and/or implementing advanced reconstruction techniques. A CT scanner with a single x-ray source may scan at a speed up to 3 Hz (Hertz), with the scanning speed limited by centrifugal force-limited rotation speed.

Cardiovascular diseases (CVDs) are the leading cause of death globally, taking tens of millions of lives each year. Dynamic cardiac studies may provide valuable information but are limited by constraints on temporal resolution. Electrocardiogram (ECG)-gating may account for the cyclical cardiac motion, improving temporal resolution and minimizing image artifacts. However, ECG-gating may be less effective in patients with irregular and/or fast heart rates, and has an associated relatively high radiation exposure due to continuous overlapped scanning and retrospective data grouping.

SUMMARY

In some embodiments, there is provided a dynamic multi-source image reconstruction apparatus. The apparatus includes a first reconstruction stage, a second reconstruction stage, and a refinement stage. The first reconstruction stage is configured to receive an input data set including a group of data frames. Each data frame corresponds to a respective time step. Each data frame includes a number of projection data sets. Each projection data set corresponds to a respective source-detector pair of a stationary multi-source tomography system. The first reconstruction stage is further configured to reconstruct a first intermediate image based, at least in part, on the group of data frames. The second reconstruction stage is configured to receive a selected data frame and to reconstruct a second intermediate image with a constraint of the first intermediate image as prior. The refinement stage is configured to refine the second intermediate image to produce a three-dimensional output image.

In some embodiments, the apparatus further includes a preprocessing stage configured to arrange at least a portion of the group of data frames in a chronological order.

In some embodiments of the apparatus, at least one of the first reconstruction stage, the second reconstruction stage and the refinement stage includes a tensor dictionary.

In some embodiments of the apparatus, training at least one of the first reconstruction stage, the second reconstruction stage or the refinement stage is unsupervised.

In some embodiments of the apparatus, the first reconstruction stage is configured to implement a compressed sensing-based reconstruction, the second reconstruction stage is configured to implement a prior-constrained reconstruction, and the refinement stage is configured to implement a deep prior refinement.

In some embodiments of the apparatus, the deep prior refinement is performed based, at least in part, on a deep image prior.

In some embodiments of the apparatus, the first reconstruction stage is configured to implement a deep prior prediction, the second reconstruction stage is configured to implement a sparsity group prior reconstruction, and the refinement stage is configured to implement a temporal sensing reconstruction.

In some embodiments, there is provided a method for dynamic multi-source image reconstruction. the method includes receiving, by a first reconstruction stage, an input data set including a group of data frames. Each data frame corresponds to a respective time step. Each data frame includes a number of projection data sets. Each projection data set corresponds to a respective source-detector pair of a stationary multi-source tomography system. The method further includes reconstructing, by the first reconstruction stage, a first intermediate image based, at least in part, on the group of data frames. The method further includes receiving, by a second reconstruction stage, a selected data frame. The method further includes reconstructing, by the second reconstruction stage, a second intermediate image with a constraint of the first intermediate image as prior. The method further includes refining, by a refinement stage, the second intermediate image to produce a three-dimensional output image.

In some embodiments, the method further includes arranging, by a preprocessing stage, at least a portion of the group of data frames in a chronological order.

In some embodiments of the method, at least one of the first reconstruction stage, the second reconstruction stage and the refinement stage includes a tensor dictionary.

In some embodiments of the method, training at least one of the first reconstruction stage, the second reconstruction stage or the refinement stage is unsupervised.

In some embodiments of the method, the first reconstruction stage is configured to implement a compressed sensing-based reconstruction. The second reconstruction stage is configured to implement a prior-constrained reconstruction. The refinement stage is configured to implement a deep prior refinement.

In some embodiments of the method, the first reconstruction stage is configured to implement a deep prior prediction. The second reconstruction stage is configured to implement a sparsity group prior reconstruction. The refinement stage is configured to implement a temporal sensing reconstruction.

In some embodiments, there is provided a system for dynamic multi-source image reconstruction. The system includes a computing device that includes a processor, a memory, an input/output circuitry, and a data store. The system further includes a first reconstruction stage, a second reconstruction stage, and a refinement stage. The first reconstruction stage is configured to receive an input data set including a group of data frames. Each data frame corresponds to a respective time step. Each data frame includes a number of projection data sets. Each projection data set corresponds to a respective source-detector pair of a stationary multi-source tomography system. The first reconstruction stage is further configured to reconstruct a first intermediate image based, at least in part, on the group of data frames. The second reconstruction stage is configured to receive a selected data frame and to reconstruct a second intermediate image with a constraint of the first intermediate image as prior. The refinement stage is configured to refine the second intermediate image to produce a three-dimensional output image.

In some embodiments, the system further includes a preprocessing stage configured to arrange at least a portion of the group of data frames in a chronological order.

In some embodiments of the system, at least one of the first reconstruction stage, the second reconstruction stage and the refinement stage includes a tensor dictionary.

In some embodiments of the system, training at least one of the first reconstruction stage, the second reconstruction stage or the refinement stage is unsupervised.

In some embodiments of the system, the first reconstruction stage is configured to implement a compressed sensing-based reconstruction. The second reconstruction stage is configured to implement a prior-constrained reconstruction. The refinement stage is configured to implement a deep prior refinement.

In some embodiments of the system, the first reconstruction stage is configured to implement a deep prior prediction. The second reconstruction stage is configured to implement a sparsity group prior reconstruction. The refinement stage is configured to implement a temporal sensing reconstruction.

In some embodiments, there is provided a computer readable storage device. The device has stored thereon instructions that when executed by one or more processors result in the following operations including any embodiment of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
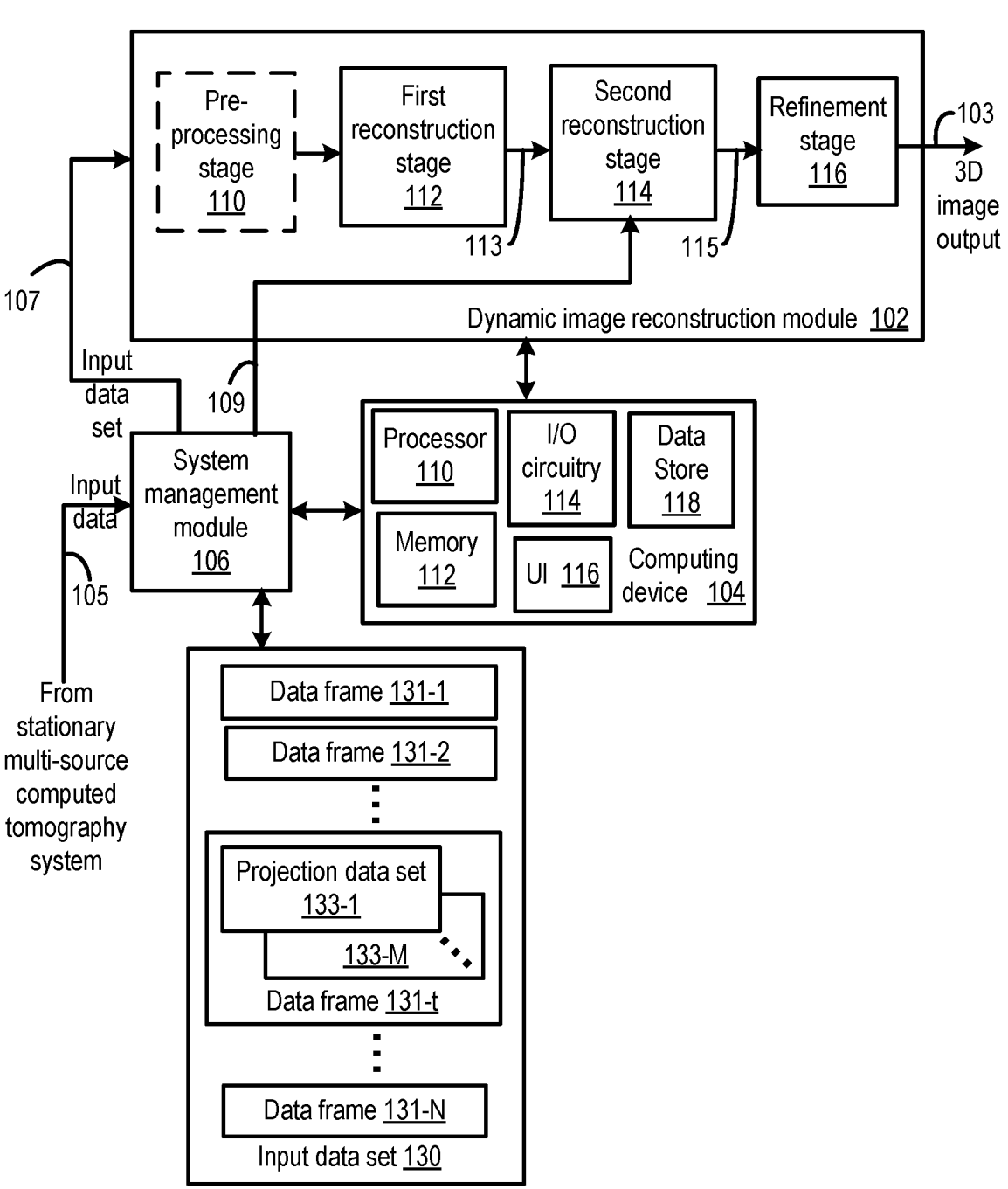
FIG. 1 illustrates a functional block diagram of a dynamic multi-source image reconstruction system, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

A computed tomography (CT) imaging system configured to provide parallel projection data capture may provide an improved temporal resolution relative to conventional CT scanners. Such a CT imaging system may be "multi-source", i.e., may include a plurality of source-detector pairs configured to capture projection data in parallel. For example, in order to image a beating heart, a plurality of data frames may be captured with each data frame including a plurality of projection data sets. Each projection data set may correspond to a respective source-detector pair, and each data frame may correspond to a respective time step.

The multi-source CT imaging system may be configured for micro-CT, with the source-detector pairs arranged in a circle, and the object to be imaged positioned on a table located at or near a center of the circle. A respective position of each source-detector pair may be fixed. The table may be configured to rotate, with a range of rotation related to a field of view of the source-detector pairs. In one nonlimiting example, the multi-source CT imaging system may include a number, e.g., 29, x-ray source and detector pairs. It may be appreciated that 29 source-detector pairs may provide relatively sparse projection data sets. It may be further appreciated that a field of view of the multi-source CT imaging system may be truncated.

In one nonlimiting example, a Stationary Multi-source AI-based Real-time Tomography (SMART) system was developed, with 29 source-detector pairs fixed on a circular track configured to collect x-ray signals in parallel, i.e., simultaneously. In this example, each source detector pair included a 5 kW (kilowatt) monoblock x-ray source and an flat panel detector of $153.6 \times 153.6$ mm$^2$ (millimeters squared) imaging area. A source-isocenter-distance (SID) and detector-isocenter-distance (DID) were set to 2000 mm and 1000 mm, respectively. Each detector cell covered an area of $0.2 \times 0.2$ mm$^2$. The x-ray beam generated by each x-ray source was collimated through a gap between neighboring detectors. An animal to be imaged is placed inside the imaging ring with a zooming factor of 1.87.

During the CT data collection, the source-detector imaging pairs were turned on to capture cone-beam projections simultaneously. In one nonlimiting example, a sequence of x-ray pulses was fired at 10 frames per second (fps). Since the x-ray sources are symmetrically distributed, a rotation range of 12.4 degrees may be sufficient for high density sampling in the data domain, and which can be used for evaluation of the imaging fidelity. For example, in rat experiments, the x-ray energy was set at 70 kV (kilovolts), the current to 30 mA (milliamperes), and the pulse width of exposure 20 ms (millisecond). Projection calibration and scattering correction were provided by software.

The system architecture is configured to provide an improvement in temporal resolution compared to a conventional CT imaging system. To achieve relatively high-quality dynamic images from truncated and sparse measurements, an AI (artificial intelligence)-empowered interior tomography approach network was developed, where a relationship among different timeframes was utilized and raw time-group average images were reconstructed. The interior CT reconstruction network is trained to recover relatively high-quality deep group-average images from raw time-group average images. A sparsity dictionary was trained from prior deep group-average images and a reconstructed high-quality group-average image using a compressed sensing model. A final reconstruction was obtained based, at least in part, on a current measurement and the group-average prior image. A SMART imaging system, consistent with the present disclosure, is configured to have a relatively high temporal resolution thus relatively high-quality interior CT images of the heart and lungs in small animal models may be obtained.

To reconstruct a relatively high-quality image from an under-sampled dataset, it is helpful to explore the synergy among different time frames. One way is to incorporate a prior image to impose a constraint in the image space. A quality of a prior image may affect a quality of a reconstruction. To obtain a relatively high-quality prior image, sufficient data may be collected from a relatively large number of x-ray source positions to reconstruct a prior image. Because the imaging object may vary aperiodically, a complete dataset cannot be obtained over time. To a first order approximation, the precision rotation table may be rotated to acquire data for different cardiac phases, for example. The projections from different timeframes can be considered as complete (sufficiently many viewing angles) but inconsistent due to cardiac motion. The projections may be pre-processed and a deep learning-based and/or tensor dictionary-based reconstruction may be performed. In one nonlimiting example, pre-processing may include arranging at least a portion of a group of data frames in at least one of a chronological order and/or physiological order. The projections may be rearranged in a chronological order for spatiotemporal sparsity-promoting image reconstruction in the AI-empowered interior tomography approach. In an embodiment, a workflow of the reconstruction approach may include a first reconstruction stage, a second reconstruction stage and a refinement stage. In one example, the workflow of the reconstruction approach may include a compressed sensing reconstruction stage, a prior constrained reconstruction stage and a deep prior refinement stage. In another example, the workflow of the reconstruction approach may include a deep group-prior prediction, sparsity group-prior reconstruction, and temporal image refinement.

By way of theoretical background, CT image reconstruction may include recovering an underlying image from projection data. Let $A \in \mathbb{R}^{m \times N}$ ($m \ll N$) be a discrete-to-discrete linear transform representing a CT system model from image pixels to detector readings; $y \in \mathbb{R}^m$ is an original dataset, $e \in \mathbb{R}^m$ is data noise in y, and $x \in \mathbb{R}^N$ is the image to be reconstructed. $m \ll N$ signifies that the inverse problem is highly under-determined. L represents a sparsifying transform to enforce prior knowledge on the image content. Conventionally, a feasible solution can be achieved by optimizing the $\ell_1$-norm surrogate as follows:

$$x^* = \underset{x}{\operatorname{argmin}} \|Lx\|_1, \tag{1}$$

subject to $$y = Ax + e.$$

In most cases of CT image reconstruction, the optimization relationship Eq. (1) is solved using an iterative algorithm. Eq. (1) can be converted to the following minimization relationship:

$$x^* = \underset{x}{\operatorname{argmin}} \frac{1}{2} \|y - Ax\|_2^2 + \lambda \|Lx\|_1, \tag{2}$$

where $\lambda > 0$ balances the data fidelity $$\frac{1}{2} \|y - Ax\|_2^2$$

and an image-eased sparsity $\|Lx\|_1$. The goal of Eq. (2) is to find an optimized solution by minimizing the objective function. In this context, regularized priors may include, but are not limited to, total variation, low-rank, low-dimensional manifold, sparse coding, and tensor-based dictionary learning.

As is known, a tensor is a multidimensional array. An $N^{th}$ order tensor may be defined as $\chi \in \mathcal{R}^{I_1 \times I_2 \times \cdots \times I_N}$, whose element is $x_{i_1 \times i_2 \times \ldots i_N}$, $1 \leq i_n \leq I_n$ and $n=1, 2, \ldots, N$. If N equals 1 or 2, the corresponding tensor is degraded to a vector or a matrix. A tensor can be multiplied by a vector or a matrix. Therefore, the mode-n product of a tensor $\chi$ with a matrix $H \in \mathcal{R}^{J \times I_n}$ can be defined by $X \times_n H \in \mathcal{R}^{I_1 \times I_2 \times \cdots \times I_{n-1} \times J \times I_{n+1} \times \cdots \times I_N}$, whose element in $\mathcal{R}^{I_1 \times I_2 \times \ldots \times I_{n-1} \times J \times I_{n+1} \times \ldots \times I_N}$ is calculated as $$\sum_{i_n=1}^{I_n} x_{i_1 \times i_2 \times \ldots i_N} h_{j \times i_n}.$$

In one nonlimiting example, $\chi$ corresponds to a $3^{rd}$ tensor.

For example, for a set of the $3^{rd}$-order tensors $\chi^{(t)} \in \mathcal{R}^{I_1 \times I_2 \times I_3}$ and $t=1, 2, \ldots, T$, tensor-based dictionary learning can be implemented by solving the following optimization relationship:

$$\underset{D, \alpha_t}{\operatorname{argmin}} \sum_{t=1}^{T} \|\chi^{(t)} - D \times_4 \alpha_t\|_F^2, \tag{3}$$

s.t., $$\|\alpha_t\|_0 \leq L_1,$$

where $D = \{D^{(k)}\} \in \mathcal{R}^{I_1 \times I_2 \times I_3 \times K}$ is a tensor dictionary, k and $L_1$ represent the number of atoms in the dictionary and level of sparsity respectively, $\|\cdot\|_F$ and $\|\cdot\|_0$ denote the Frobenius-norm and $L_0$-norm respectively.

The K-CPD algorithm can be employed to train a tensor dictionary. The minimization relationship Eq. (1) can be solved using an alternative direction minimization method (ADMM). A first operation may include updating the sparse coefficient matrix using a multilinear orthogonal matching pursuit (MOMP) technique for a fixed tensor dictionary. A second operation may include updating the tensor dictionary given a sparse coefficient matrix. Updating the sparse coefficient matrix alternating with updating the tensor dictionary is configured to gradually optimize the sparse coefficient matrix and the tensor dictionary.

The tensor dictionary reconstruction model in cone-beam geometry can be formulated as:

$$\underset{X, \alpha_s, m_s}{\operatorname{argmin}} \frac{1}{2} \|\mathcal{Y} - AX\|_2^2 + \tag{4}$$
$$\lambda \left( \sum_s \|\mathbb{E}_s(X) - D_m \times_4 m_r - D \times_4 \alpha_s\|_F^2 + \sum_s \kappa_s \|\alpha_s\|_0 \right).$$

where $\chi \in \mathcal{R}^{I_1 \times I_2 \times I_3}$ and $\mathcal{Y} \in \mathcal{R}^{J_1 \times J_2}$ are the $3^{rd}$-order reconstructed image and projection tensors respectively, $I_1$, $I_2$ and $I_3$ correspond to the reconstructed image volume, $J_1$ and $J_2$ correspond to the numbers of detector cells and projection views respectively, $m_r$ presents the mean vector of each channel, the operator $\mathbb{Z}_s$ extracts the $s^{th}$ tensor block (N×N× M) from $\chi$, and $\alpha_s \in \mathcal{R}^K$ is the sparse representation coefficient of the $r^{th}$ tensor block. The $D=\{D^{(k)}\} \in \mathcal{R}^{N \times N \times M \times K}$ is a trained tensor dictionary.

$$D_m = \{D_m^{(k)}\} \in \mathcal{R}^{N \times N \times M \times S}$$

represents the mean removal process.

To solve the relationship of Eq. (4), $\mathcal{Z}$ is introduced and Eq. (4) may be converted as follows:

$$\underset{\chi, \mathcal{Z}, \mathcal{W}, \alpha_s, m_s}{\mathrm{argmin}} \frac{1}{2}\|\mathcal{Y} - A\chi\|_2^2 + \frac{\eta}{2}\|\chi - \mathcal{Z} - \mathcal{W}\|_2^2 + \tag{5}$$

$$\lambda\left(\sum_s \|\mathbb{Z}_s(\mathcal{Z}) - D_m \times_4 m_s - D \times_4 \alpha_s\|_F^2 + \sum_s \kappa_s\|\alpha_s\|_0\right).$$

where $\eta > 0$ is a balance factor. The relationship Eq. (5) can be solved by dividing it into following sub-relationships:

$$\underset{\chi}{\mathrm{argmin}} \frac{1}{2}\|\mathcal{Y} - A\chi\|_2^2 + \frac{\eta}{2}\|\chi - \mathcal{Z}^{(k)} - \mathcal{W}^{(k)}\|_2^2. \tag{6}$$

$$\underset{\mathcal{Z}, \alpha_s}{\mathrm{argmin}} \frac{1}{2}\|\chi^{(k+1)} - \mathcal{Z} - \mathcal{W}^{(k)}\|_2^2 + \tag{7}$$

$$\lambda\left(\sum_s \|\mathbb{Z}_s(\mathcal{Z}) - D_m \times_4 m_s^{(k)} - D \times_4 \alpha_s\|_F^2 + \sum_s \kappa_s\|\alpha_s\|_0\right),$$

$$\underset{m_s}{\mathrm{argmin}} \|\mathbb{Z}_s(\mathcal{Z}^{(k+1)}) - D_m \times_4 m_s - D \times_4 \alpha_s^{(k+1)}\|_F^2, \tag{8}$$

$$s = 1, \dots, S,$$

$$\underset{\mathcal{W}}{\mathrm{argmin}} \frac{1}{2}\|\chi^{(k+1)} - \mathcal{Z}^{(k+1)} - \mathcal{W}\|_2^2. \tag{9}$$

Based on Eq. (6), $\chi$ may be computed iteratively:

$$\chi^{(k+1)} = \chi^{(k)} - (A^T A + \eta I)^{-1}(A^T(A\chi^{(k)} - y) + \eta(\chi^{(k)} - \mathcal{Z}^{(k)} - \mathcal{W}^{(k)})). \tag{10}$$

Eq. (7) corresponds to a tensor dictionary learning relationship, and can be solved. The solutions to Eqs. (7) and (8) can be directly obtained.

Generally, this disclosure relates to tomography, in particular to, a stationary multi-source artificial intelligence (AI)-powered real-time tomography system. A method, apparatus and/or system are configured to reconstruct a three-dimensional (3D) computed tomography image, in close to real time from a plurality of data frames, with each data frame including a plurality of projection data set captured in parallel. The method, apparatus and/or system are configured to include a plurality of reconstruction stages configured to implement one or more of compressed sensing and/or sparsity prior reconstruction, prior-constrained reconstruction, and/or refinement (e.g., deep prior and/or temporal sensing). The method, apparatus and/or system are configured to provide dynamic CT images of, for example, beating hearts.

In one embodiment, there is provided a dynamic multi-source image reconstruction apparatus. The apparatus includes a first reconstruction stage, a second reconstruction stage, and a refinement stage. The first reconstruction stage is configured to receive an input data set including a group of data frames. Each data frame corresponds to a respective time step. Each data frame includes a number of projection data sets. Each projection data set corresponds to a respective source-detector pair of a stationary multi-source tomography system. The first reconstruction stage is further configured to reconstruct a first intermediate image based, at least in part, on the group of data frames. The second reconstruction stage is configured to receive a selected data frame and to reconstruct a second intermediate image with a constraint of the first intermediate image as prior. The refinement stage is configured to refine the second intermediate image to produce a three-dimensional output image.

In some embodiments, the dynamic multi-source image reconstruction apparatus may include a preprocessing stage configured to arrange at least a portion of the group of data frames in at least one of a chronological order and/or a physiological order.

FIG. 1 illustrates a functional block diagram of a dynamic multi-source image reconstruction system 100, according to several embodiments of the present disclosure. Dynamic multisource image reconstruction system 100 includes a dynamic image reconstruction module 102, a computing device 104, and a system management module 106. Dynamic image reconstruction module 102 and/or system management module 106 may be coupled to or included in computing device 104. The dynamic image reconstruction module 102 may include and/or may correspond to a neural network. As used herein, "neural network" (NN) and "artificial neural network" (ANN) are used interchangeably. A neural network may include, but is not limited to, a deep ANN, a convolutional neural network (CNN), a deep CNN, a multilayer perceptron (MLP), etc. In an embodiment, an ANN may include an encoder neural network ("encoder") and a decoder neural network ("decoder"), as described herein.

The system management module 106 is configured to receive input data 105 from, for example, a stationary multisource tomography system. The input data 105 may include one or more data sets, each data set may include a group of data frames. For example, the system management module 106 may be configured to store an input data set 130 that includes a corresponding group of data frames 131-1, 131-2, . . . , 131-t, . . . , 131-N in data store 118. Each data frame, e.g., data frame 131-t, in the group of data frames corresponds to a respective time step. Each data frame, e.g., data frame 131-t, includes a number, M, projection data sets 133-1, . . . , 133-M. In an embodiment, the number of projection data sets, M, may correspond to a number of source-detector pairs in the stationary multisource tomography system. Each projection data set 133-1, . . . , 133-M may then correspond to a respective source detector pair. In one nonlimiting example, the number of source-detector pairs may be 29 (i.e., M=29).

Dynamic image reconstruction module 102 includes a first reconstruction stage 112, a second reconstruction stage 114, and a refinement stage 116. In some embodiments, the dynamic image reconstruction module 102 may include a pre-processing stage 110. The dynamic image reconstruction module 102 is configured to receive an input data set 107 that includes group of data frames and a selected data frame 109 from the system management module 106 and to provide, as output, a reconstructed three-dimensional image 103, as will be described in more detail below.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of dynamic image reconstruction module 102 and/or system management module 106. Memory 112 may be configured to store data associated with dynamic image reconstruction module 102 and/or system management module 106. I/O circuitry 114 may be configured to provide wired and/or wireless communication functionality for system 100. For example, I/O circuitry 114 may be configured to receive input data 105. UI 116 may include a user input device (e.g., keyboard, mouse, microphone, touch sensitive display, etc.) and/or a user output device, e.g., a display. Data store 118 may be configured to store one or more of input data 105, group of data frames 107, selected data frame 109, reconstructed 3-D image output data 103, input data set 130, and/or data associated with dynamic image reconstruction module 102 and/or system management module 106.

In some embodiments, the first reconstruction stage 112 is configured to receive the input data set 107 that includes a group of data frames. In some embodiments, the input data set 107 may be preprocessed by pre-processing stage 110, prior to provision to the first reconstruction stage 112. Pre-processing stage 110 may be configured to arrange at least a portion of the group of data frames in at least one of a chronological order and/or a physiological order. The first reconstruction stage 112 may be configured to reconstruct a first intermediate image 113 based, at least in part, on the group of data frames. The second reconstruction stage 114 may be configured to receive a selected data frame 109 and to reconstruct a second intermediate image 115 with a constraint of the first intermediate image 113 as prior. The refinement stage 116 may be configured to refine the second intermediate image 115 to produce a three-dimensional output image 103.

Thus, a 3D image may be reconstructed based, at least in part, on an input data set that includes a plurality of data frames, with each data frame including a plurality of projection data sets captured simultaneously and each data frame associated with a respective time step.

Figure 2:
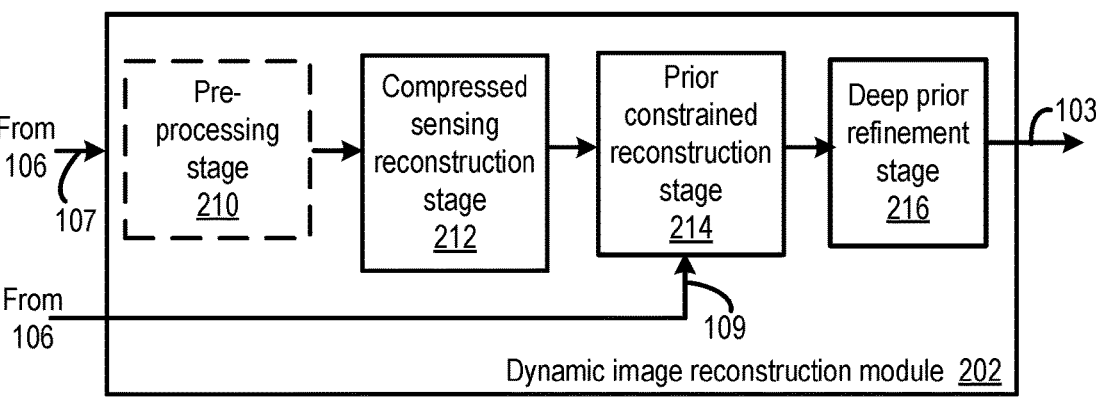
FIG. 2 illustrates a functional block diagram of an example dynamic image reconstruction module, according to an embodiment of the present disclosure.

FIG. 2 illustrates a functional block diagram of an example dynamic image reconstruction module 202, according to an embodiment of the present disclosure. Example dynamic image reconstruction module 202 is one example of dynamic image reconstruction module 102 of FIG. 1. Dynamic image reconstruction module 202 includes a compressed sensing reconstruction stage 212, a prior-constrained reconstruction stage 214, and a deep prior refinement stage 216. In some embodiments, dynamic image reconstruction module 202 may include preprocessing stage 210. The dynamic image reconstruction module 202 is configured to receive a group of data frames 107 from the system management module 106 of FIG. 1. The dynamic image reconstruction module 202, e.g., prior-constrained reconstruction stage 214, is configured to receive a selected data frame 109 from the system management module 106. The dynamic image reconstruction module 202 is configured to reconstruct a 3D CT image output 103 based, at least in part, on the group of data frames 107 and the selected data frame 109.

It may be appreciated that a ground truth for supervised deep reconstruction may not be available for dynamic cardiac preclinical CT imaging. A deep convolutional network may perform relatively well in learning realistic image priors from a relatively large number of example images.

For example, a structure of a selected convolutional network may be sufficient to capture a relatively large amount of relatively low-level information as a deep image prior. For example, a randomly-initialized neural network can serve as an image prior for inverse problems.

It may be appreciated that not all image priors must be learned from data, and a number of image statistics can be captured by the structure of a deep convolutional network through independent learning. In other words, data-driven image statistics may be used to solve imaging relationships without a ground truth. Assuming a deep decoding network with a parametric function $\chi = f_\theta(w)$ that maps a code vector w to an image $\chi$. A recovery network can be used to model a complex mapping function over images. A relatively large amount of information about the distribution of permissible images may be reflected in the network structure. Rather than learning specific concepts on or features of a specified object through training on a relatively large dataset, $f_\theta$ is configured to capture relatively low-level statistics of relevant images.

Similar to a conventional prior regularizing an inverse problem, an energy minimization relationship may be formulated as:

$$X^* = \underset{X}{\arg\min}\, E(X, X_0) + r(X), \tag{11}$$

where $E(\chi, \chi_0)$ represents a task-dependent data term, $\chi_0$ is a degraded image, and $r(\chi)$ is a regularizer. The $E(\chi, \chi_0)$ may be chosen as an $L_2$-norm or $L_1$-norm. The regularizer $r(\chi)$ may not be tied to a specific application, because it captures a general knowledge of images. Total Variation (TV) is a relatively simple example to encourage uniform regions in an image. As described herein, a deep image prior may be configured to replace an explicit analytic regularizer $r(\chi)$ with an implicit prior captured by the deep neural network as follows:

$$\theta^* = \underset{\theta}{\arg\min}\, E(f_\theta(w); X_0), \quad X^* = f_\theta^*(w), \tag{12}$$

That is, a (local) minimizer $\theta^*$ is obtained using an optimizer such as a gradient descent search algorithm, starting from a random initialization of the parameters $\theta$.

Turning again to FIG. 2, dynamic image reconstruction module 202 is configured to integrate both a sparsified image prior (SIP) and a deep image prior (DIP) to reconstruct a 3D image from relatively sparse projection data. The compressed sensing reconstruction stage 212 is configured to implement compressed sensing-based reconstruction using a complete but inconsistent projection dataset. The compressed sensing reconstruction stage 212 is configured to accommodate a structure and an intensity of a plurality of different time frames. The compressed sensing reconstruction stage 212 is configured to reconstruct initial images, which can be treated as the prior image. In the second stage, i.e., the prior-constrained reconstruction stage 214, a relatively high-quality image may be reconstructed using the following model:

$$\underset{X, \alpha_{s_1}, m_{s_1}, \alpha_{s_2}, m_{s_2}}{\arg\min}\, \frac{1}{2}\|\mathbf{y} - AX\|_2^2 + \tag{13}$$

-continued $$\lambda_1\left(\sum_{s_1}\left\|\mathbb{Z}_{s_1}(\mathcal{X}) - D_m \times_4 m_{s_1} - D \times_4 \alpha_{s_1}\right\|_F^2 + \sum_{s_1}\kappa_{s_1}\left\|\alpha_{s_1}\right\|_0\right) +$$

$$\lambda_2\left(\sum_{s_2}\left\|\mathbb{Z}_{s_2}(\mathcal{X} - \mathcal{X}^D) - D_m \times_4 m_{s_2} - D \times_4 \alpha_{s_2}\right\|_F^2 + \sum_{s_2}\kappa_{s_2}\left\|\alpha_{s_2}\right\|_0\right),$$

To obtain the solution of Eq. (13), a similar strategy for solving Eq. (6) may be employed. Here, $\mathbb{Z}_1$ and $\mathbb{Z}_2$ may be introduced to replace with $\chi$ and $\chi-\chi^D$, and $\chi^D$ denotes the prior image obtained in the CS-based reconstruction step, i.e., output from the compressed sensing reconstruction stage 212. Hence, Eq. (6) can be converted into $$\underset{\mathcal{X}}{\operatorname{argmin}} \frac{1}{2}\|\mathcal{Y} - A\mathcal{X}\|_2^2 + \tag{14}$$

$$\frac{\eta_1}{2}\left\|\mathcal{X} - \mathcal{Z}_1^{(k)} - \mathcal{W}_1^{(k)}\right\|_2^2 + \frac{\eta_2}{2}\left\|\mathcal{X} - \mathcal{Z}_2^{(k)} - \mathcal{W}_2^{(k)}\right\|_2^2.$$

where $\eta_1 > 0$ and $\eta_2 > 0$ may be empirically chosen. Similar to the description herein, $\mathcal{W}_1$ and $\mathcal{W}_2$ are error feed-back variables to be updated next.

In the deep prior refinement stage 216, i.e., a deep network estimation stage, the deep image prior may be incorporated to improve image quality according to Eq. (12). A refinement image may be generated from a noise image. The target image may be reconstructed via a prior-constrained reconstruction. Advantageously, the deep network may facilitate removal of residual image artifacts without relying on the ground truth. As described herein, the network architecture of dynamic image reconstruction module 202 may be configured to encode and decode images of interest.

It may be appreciated that example dynamic image reconstruction module 202 belongs to a category of hybrid reconstruction methods, since it combines deep learning, compressed sensing and algebraic iteration. In other words, there are regularization parameters to be chosen in a task-specific fashion. For example, $\eta$, $\eta_1$ and $\theta_2$ represent coupling factors configured to balance associated components. k and $L_1$ represent a number of dictionary atoms and a level of sparsity in the compressed reconstruction operation (i.e., compressed sensing reconstruction stage 212). $k_1$ and $L_2$ represent the number of dictionary atoms and the level of sparsity in the prior-constrained reconstruction operation (i.e., prior-constrained reconstruction stage 214). In this study, $L_1$ was set to be the same as $L_2$. Example parameters values for example dynamic image reconstruction module 202, in one nonlimiting example, are summarized in Table I.

TABLE I

| Example network parameters for dynamic cardiac imaging. | | | | | | | |
|---|---|---|---|---|---|---|---|
| Parameters | $\eta$ | $\eta_1$ | $\eta_2$ | k | $L_1$ | $k_1$ | $L_2$ |
| Rat Study | 0.01 | 0.2 | 0.2 | 5 | 0.0001 | 5 | 0.0005 |

Thus, example dynamic image reconstruction module 202 is one example of dynamic image reconstruction module 102 of FIG. 1. The dynamic image reconstruction module 202 is configured to receive a group of data frames 107 and a selected data frame 109 from the system management module 106. The dynamic image reconstruction module 202 is configured to reconstruct a 3D CT image output 103 based, at least in part, on the group of data frames 107 and the selected data frame 109.

Figure 3:
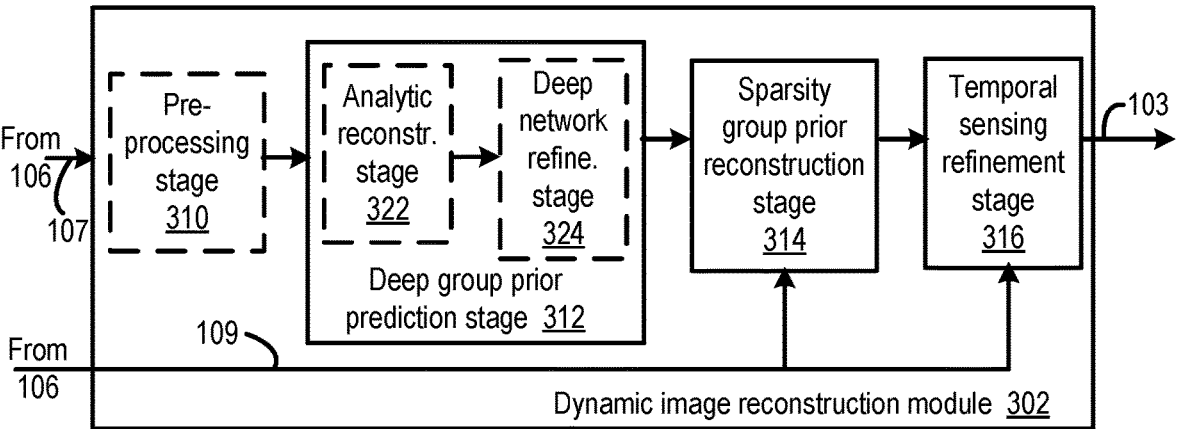
FIG. 3 illustrates a functional block diagram of another example dynamic image reconstruction module, according to an embodiment of the present disclosure.

FIG. 3 illustrates a functional block diagram of another example dynamic image reconstruction module 302, according to an embodiment of the present disclosure. Example dynamic image reconstruction module 302 is one example of dynamic image reconstruction module 102 of FIG. 1. Example dynamic image reconstruction module 302 includes a deep group prior prediction stage 312, a sparsity group prior reconstruction stage 314, and a temporal sensing refinement stage 316. In some embodiments, dynamic image reconstruction module 302 may include preprocessing stage 310. The deep group prior prediction stage 312 includes an analytic reconstruction stage 322 and a deep network refinement stage 324.

The dynamic image reconstruction module 302 is configured to receive a group of data frames 107 from the system management module 106 of FIG. 1. The dynamic image reconstruction module 302, e.g., sparsity group prior reconstruction stage 314, and temporal sensing refinement stage 316, are configured to receive a selected data frame 109 from the system management module 106. The dynamic image reconstruction module 302 is configured to reconstruct a 3D CT image output 103 based, at least in part, on the group of data frames 107 and the selected data frame 109.

The deep group prior prediction stage 312 is configured to implement deep network-based reconstruction using the complete but inconsistent projection dataset, where the structure and intensity of different timeframes are considered, as described herein. The deep group prior prediction stage 312, e.g., analytic reconstruction stage 322, is configured to reconstruct an initial image volume using an analytic reconstruction technique, which may be considered the group-based averaged image X. In one nonlimiting example, the analytic reconstruction technique may correspond to an FDK technique. As is known, the FDK technique is Feldkamp, Davis and Kress cone-beam algorithm, used for CT image reconstruction.

The deep group prior prediction stage 312, e.g., deep network refinement stage 324, is configured to refine the group-based reconstruction.

Figure 4:
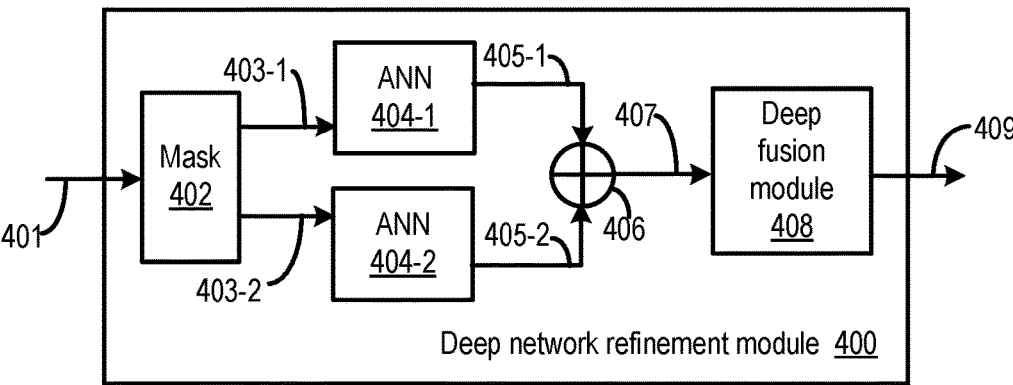
FIG. 4 illustrates a functional block diagram of an example deep network refinement module for the dynamic image reconstruction module of FIG. 3.

FIG. 4 illustrates a functional block diagram of an example deep network refinement module 400 for the dynamic image reconstruction module 302 of FIG. 3. The deep network refinement module 400 is one example of deep network refinement stage 324 of FIG. 3. The deep network refinement module 400 is configured to receive a reconstructed image 401 from, for example, analytic reconstruction stage 322, and to provide as output 409. The deep network refinement module 400 includes a mask 402, two ANNs 404-1, 404-2, a summing stage 406, and a deep fusion module 408. The mask 402 is configured to receive the reconstructed image 401. The mask 402 is configured to provide a first output 403-1 corresponding to a region of interest with an exterior region removed, and a second output 403-2 corresponding to the exterior region with the region of interest removed. The first output 403-1 is provided to a first ANN 404-1, and the second output 403-2 was provided to a second ANN 404-2. Outputs of the first and second ANNs may then be added by summing stage 406 to produce summing stage output sum 407. The output sum 407 provided to the deep fusion module 408 configured to produce output 409.

The deep network refinement stage 324, e.g., deep network refinement module 400, is configured to receive analytic reconstruction results (from analytic reconstruction stage 322) and may have or may receive the mask 402. The mask M 402 corresponds to a diameter of a field of view (FOV). For example, a first image region covered by the FOV may be set to 1 while a second image region positioned outside of the FOV may be set to 0. The first image region 403-1 may thus correspond to the FOV, and the second image region 403-2 may thus correspond to the exterior. The deep network refinement module 400 may thus be configured to perform a Hadamard product between X with M to yield $X_1$ 403-1 and $X_2$ 403-2, i.e., $$\begin{cases} X_1 = X \odot M \\ X_2 = X - X \odot M' \end{cases}$$

The first image region $X_1$ 403-1 and the second image region $X_2$ 403-2 may then be provided to respective ANNs, e.g., ANN 404-1 and ANN 404-2, respectively. In one nonlimiting example, ANN 404-1 and ANN 404-2 may each correspond to a respective encoder-decoder network. A respective output of each ANN 404-1, 404-2 may then correspond to $X_3 = g_{\theta 1}(X_1)$ 405-1 and $X_4 = g_{\theta 2}(X_2)$ 405-2, respectively.

Figure 5:
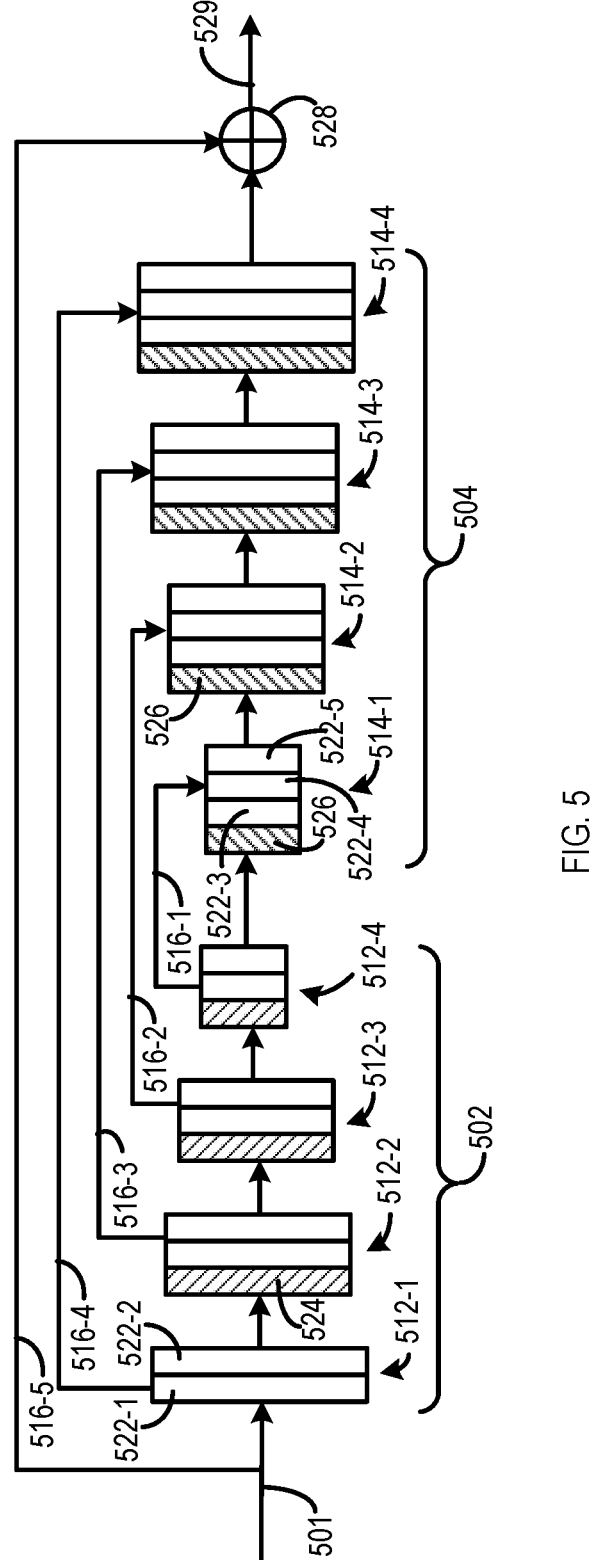
FIG. 5 illustrates a functional block diagram of an example artificial neural network, according to several embodiments of the present disclosure.

FIG. 5 illustrates a functional block diagram of an example artificial neural network (ANN) 500, according to several embodiments of the present disclosure. ANN 500 is one example of the ANNs 404-1, 404-2 of FIG. 4. ANN network 500 includes an encoder portion 502 and a decoder portion 504. The encoder portion 502 is further coupled to the decoder portion 504 by a plurality of skip connections 516-1, . . . , 516-4. ANN 500 includes an input 501, an output 529, and further includes a summing stage 528 coupled to the decoder portion 504. The input 501 is coupled to the summing stage 528 by a fifth skip connection 516-5. An output of the summing stage corresponds to the output 529 of ANN 500.

The encoder portion 502 includes a plurality, e.g., four, forward transform blocks 512-1, . . . , 512-4, coupled in series. Each forward transform block, e.g., a first forward transform block 512-1, includes a plurality of convolutional blocks, e.g., first convolutional block 522-1, and second convolutional block 522-2. Each convolutional block includes a convolutional layer, a batch normalization (BN) layer and a rectified linear unit (ReLU). Each other forward transform block 512-2, 512-3, 512-4, i.e., other than the first forward transform block 512-1, includes a pooling block, e.g., pooling block 524 of forward transform block 512-2, prior to the first convolutional block.

The decoder portion 504 includes a plurality, e.g., four, inverse transform blocks 514-1, . . . , 514-4, coupled in series. Each inverse transform block, e.g., a first inverse transform block 514-1, includes a plurality of convolutional blocks, e.g., third convolutional block 522-3, fourth convolutional block 522-4, and fifth convolutional block 522-5. Each convolutional block includes a convolutional layer, a BN layer and a ReLU. Each inverse transform block includes an unpooling block, e.g., unpooling block 526, prior to the convolutional block.

A fourth forward transform block 512-4 is coupled to the first inverse transform block 514-1. The fourth forward transform block 512-4 is further coupled to the first inverse transform block 514-1 by a first skip connection 516-1. A third forward transform block 512-3 is coupled to a second inverse transform block 514-2 by a second skip connection 516-2. A second forward transform block 512-2 is coupled to a third inverse transform block 514-3 by a third skip connection 516-3. The first forward transform block 512-1 is coupled to a fourth inverse transform block 514-4 by a fourth skip connection 516-4.

Thus, ANN 500 may be configured to receive a respective mask 403-1 or 403-2 and to provide a respective output 405-1 or 405-2, respectively.

Turning again to FIG. 4, the output 409 of the deep network refinement module 400 corresponds to a fusion of $X_3$ 405-1 and $X_4$ 405-2. $X_3$ 405-1 and $X_4$ 405-2 may be summed by summing stage 406, to produce sum 407, that is then provided to deep fusion module 408. An output of deep fusion module 408 may then correspond to the output 409 of the deep network refinement module 409, which can be given as $X_5 = g_{\theta 3}(X_3, X_4)$. In one nonlimiting example, the deep fusion module 408 may include a convolutional layer with both kernel and stride sizes set to 1.

In one nonlimiting example, a total loss function of the deep network refinement module 400 include two portions. A first portion corresponds to the ROI and a second portion corresponds to the exterior. The total loss function may be written as:

$$Loss_{total} = \frac{1}{N} \sum_{n=1}^{N}$$
$$\left( \|X_5^n \odot M - (X^*)^n \odot M\|_F^2 + \lambda \|X_5^n - X_5^n \odot M - (X^*)^n + (X^*)^n \odot M\|_F^2 \right),$$

where $\lambda > 0$ represents the factor balancing the components from ROI and exterior region, $X^*$ is set to 0.1 representing the corresponding label, and N is the number of training datasets. The deep network refinement module 400 is configured to reconstruct slices one-by-one.

Thus, deep group prior prediction stage 312, that includes analytic reconstruction stage 322, and deep network refinement stage 324 (e.g., deep network refinement module 400), is configured to implement deep network-based reconstruction using the complete but inconsistent projection dataset.

It may be appreciated that for cardiac CT imaging, structures may be deformed across different timeframes. To improve the reconstruction performance using under-sampling sparse measurements, sparsity regularization techniques may be used to reconstruct relatively high-quality group average images from corresponding group projections. Sparsity group prior reconstruction stage may be configured reconstruct a relatively high-quality group-based image using the following model:

$$\underset{X, \alpha_{s_1}, m_{s_1}, \alpha_{s_2}, m_{s_2}}{argmin} \frac{1}{2} \|y' - AX\|_2^2 + \tag{15}$$
$$\lambda_1 \left( \sum_{s_1} \|Z_{z_1}(X) - D_m \times_4 m_{s_1} - D \times_4 \alpha_{s_1}\|_F^2 + \sum_{s_1} \kappa_{s_1} \|\alpha_{s_1}\|_0 \right) +$$
$$\lambda_2 \left( \sum_{s_2} \|Z_{s_2}(X - X^D) - D_m \times_4 m_{z_2} - D \times_4 \alpha_{z_2}\|_F^2 + \sum_{s_2} \kappa_{s_2} \|\alpha_{s_2}\|_0 \right),$$

where $y'$ corresponds to combined projections with different time-frame measurements and $\lambda_1$ is a balance factor to trade-off the data fidelity term and regularization term. To obtain the solution of Eq. (15), a similar strategy for solving Eq. (6) is employed. $Z_1$ and $Z_2$ are configured to replace $\chi$ and $\chi - \chi^D$, respectively. $\chi^D$ corresponds to the prior image determined by the deep group-prior prediction stage 312. Eq. (6) can be converted into $$\underset{X}{\operatorname{argmin}}\frac{1}{2}\|\mathbfcal{Y}-AX\|_2^2+\frac{\eta_1}{2}\|X-\mathcal{Z}_1^{(k)}-\mathbfcal{W}_1^{(k)}\|_2^2+\frac{\eta_2}{2}\|X-\mathcal{Z}_2^{(k)}-\mathbfcal{W}_2^{(k)}\|_2^2.$$

where $\eta_1>0$ and $\eta_2>0$ may be empirically chosen. $\mathbfcal{W}_1$ and $\mathbfcal{W}_2$ correspond to error feed-back variables that are to be updated. It may be appreciated that the prediction provided by the deep group prior prediction stage may be used to train the tensor dictionary.

The sparsity group prior reconstruction stage 314 is configured to provide sparsity regularization.

It may be appreciated that relatively high-quality group images may be reconstructed from different timeframes. The reconstructed images may include blurred and other artifacts related to dynamically changing structures. Temporal sensing refinement stage 316 is configured to receive sparsity group prior reconstruction stage 314 output (i.e., sparsity prior) and the selected data frame, and to reconstruct an image output corresponding to the selected data frame. Temporal sensing refinement stage 316 may thus be configured to combine temporal measurement data and group prior images to reconstruct relatively small structural changes. Temporal sensing refinement stage 316 may thus be configured to improve the temporal resolution of dynamic image reconstruction module by using the reconstructed results from the sparsity group prior reconstruction stage 314 as the prior images in the iteration reconstruction model of Eq. (15). The selected data frame 109, i.e., original timeframe measurement, may then be used to refine the final results. A same tensor dictionary used in the sparsity group prior reconstruction stage 314 may be used in the temporal sensing refinement stage 316.

Regarding training dynamic reconstruction module 302, the Adam method may be used to optimize the stages. To address the inconsistency in sizes of feature maps and that of the input, padding zeros around the boundaries may be included before convolution. In one nonlimiting example, the batch size may be set to 1, the number of epochs may be 50. Continuing with this example, the learning rate may be set to 2.5×10−4 and decreased by 0.8 after each of 5 epochs.

It may be appreciated that example dynamic image reconstruction module 302 belongs to the category of hybrid reconstruction methods since it combines deep learning, compressed sensing and algebraic iteration. In other words, there are regularization parameters to be chosen in a task-specific fashion. There are at least five parameters in the $2^{nd}$ and $3^{rd}$ stages, the balance factors $\eta_1$ and $\eta_2$, the number of dictionary atoms M, and the level of sparsity L. For example, $\eta_1$ and $\eta_2$ represent the coupling factors to balance the associated components in the sparsity group prior reconstruction stage 314. $\eta_3$ and $\eta_4$ represent the coupling factors to balance the associated components in the temporal sensing refinement stage 316. $M_1$ and $M_2$ represent the number of dictionary atoms in the sparsity group prior reconstruction stage 314 and the temporal sensing refinement stage 316. $L_1$ and $L_2$ represent the level of sparsity in the sparsity group prior reconstruction stage 314 and the temporal sensing refinement stage 316. Example parameters values for example dynamic image reconstruction module 302, in one nonlimiting example, are summarized in Table II.

TABLE II

Example network parameters for dynamic cardiac imaging.

| Parameters | $\eta_1$ | $\eta_2$ | $\eta_3$ | $\eta_4$ | $L_1$ | $L_2$ | $M_1$ | $M_2$ |
|---|---|---|---|---|---|---|---|---|
| Dead Rat | 0.15 | 0.15 | 0.15 | 0.15 | 0.001 | 0.0004 | 5 | 5 |
| Alive Rat | 0.15 | 0.15 | 0.15 | 0.15 | 0.001 | 0.0004 | 5 | 5 |
| Rabbit | 0.15 | 0.25 | 0.30 | 0.30 | 0.0012 | 0.002 | 10 | 10 |

Thus, example dynamic image reconstruction module 302 is one example of dynamic image reconstruction module 102 of FIG. 1. The dynamic image reconstruction module 302 is configured to receive a group of data frames 107 and a selected data frame 109 from the system management module 106. The dynamic image reconstruction module 302 is configured to reconstruct a 3D CT image output 103 based, at least in part, on the group of data frames 107 and the selected data frame 109.

Figure 6:
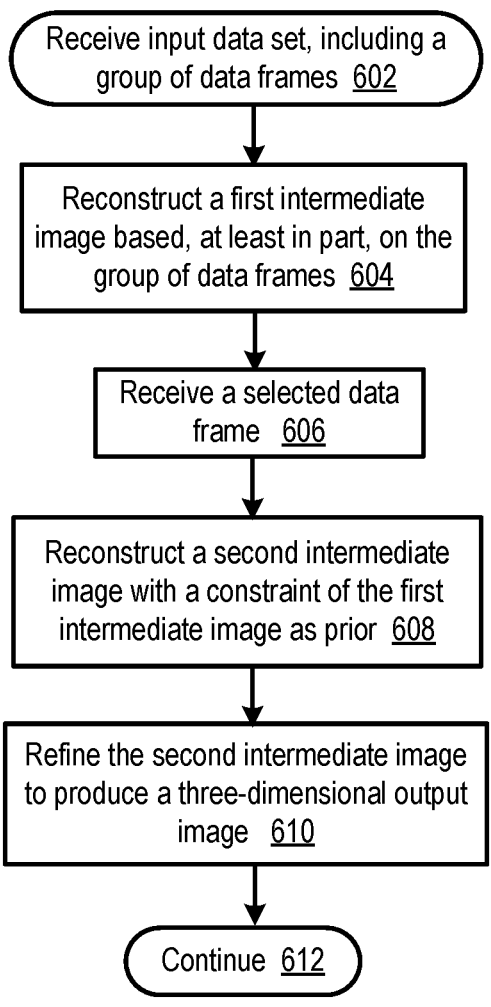
FIG. 6 is a flowchart of dynamic multi-source image reconstruction operations, according to various embodiments of the present disclosure.

FIG. 6 is a flowchart 600 of dynamic multi-source image reconstruction operations, according to various embodiments of the present disclosure. In particular, the flowchart 600 illustrates reconstructing a three-dimensional output image from a group of data frames received from a stationary multi-source tomography system. The operations may be performed, for example, by the dynamic multi-source image reconstruction system 100 (e.g., dynamic image reconstruction module 102, and/or the SMART management module 106) of FIG. 1, the dynamic image reconstruction module 202 of FIG. 2, and/or the dynamic image reconstruction module 302 of FIG. 3.

Operations of this embodiment may begin with receiving an input data set, including a group of data frames at operation 602. Operation 604 includes reconstructing a first intermediate image based, at least in part, on the group of data frames. Operation 606 includes receiving a selected data frame. Operation 608 includes reconstructing a second intermediate image with a constraint of the first intermediate image as prior. Operation 610 includes refining the second intermediate image to produce a three-dimensional output image. Program flow may then continue at operation 612.

Thus, a three-dimensional output image may be reconstructed from a group of data frames received from a stationary multi-source tomography system.

Generally, this disclosure relates to tomography, in particular to, a stationary multi-source artificial intelligence (AI)-powered real-time tomography system. A method, apparatus and/or system are configured to reconstruct a three-dimensional (3D) computed tomography image, in close to real time from a plurality of data frames, with each data frame including a plurality of projection data sets captured in parallel. The method, apparatus and/or system are configured to include a plurality of reconstruction stages configured to implement one or more of compressed sensing and/or sparsity prior reconstruction, prior-constrained reconstruction, and/or refinement (e.g., deep prior and/or temporal sensing). The method, apparatus and/or system are configured to provide dynamic CT images of, for example, beating hearts.

The method, apparatus and/or system may be configured to: (1) incorporate an advanced image prior, i.e., tensor dictionary-based sparsified reconstruction, to regularize the solution space by combining different time frames; (2) approach an instantaneous image reconstruction mainly based on the current data frame and effectively regularized by the image prior; and (3) achieve superior image quality by leveraging the deep image prior.

In one nonlimiting example, a method, apparatus and/or system, according to the present disclosure, may be configured to achieve a temporal resolution of on the order of 30 ms. The temporal resolution may facilitate dynamic imaging of the chest in live rats and rabbits. The reconstructed images may have relatively high soft tissue resolution and the main organ structures may be distinguished in the chest tomographic images. The method, apparatus and/or system may produce image quality of interior CT reconstruction from only 29 views. The method, apparatus and/or system is configured to implement an imaging principle similar to cone beam CT, which can reduce the radiation dose while maintaining imaging quality. This imaging method can reduce the concern of doctors and patients about the radiation dose of CT examination and expand the application of CT examination. It is contemplated that the real-time spatiotemporal tomographic imaging performance may support research opportunities in dynamic cardiac imaging and/or contrast-enhanced cancer studies. The relatively high temporal resolution can minimize the impact of heart rate on the image, and the contraindication about heart rate in the traditional cardiac CT examination may be eliminated.

The image reconstruction, compared with classic priors, illustrates the advantages of the method, apparatus and/or system including (1) incorporation of an advanced deep prior into tensor dictionary-based sparsified reconstruction, regularizing the solution space by combining different timeframes; (2) nearly instantaneous reconstruction based on the current data frame effectively regularized by classic and deep image priors; and (3) superior image quality by synergizing deep network-based reconstruction and tensor dictionary learning.

As used in any embodiment herein, the terms "stage" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The stage and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A dynamic multi-source image reconstruction apparatus, wherein the dynamic multi-source image corresponds to dynamic computed tomography (CT) imaging captured by using a plurality of source-detector pairs configured to capture projection data, the apparatus comprising:

a first reconstruction stage configured to receive an input data set comprising a group of data frames, each data frame of the group of data frames corresponding to a respective time step, each data frame comprising the group of data frames comprising a number of projection data sets, each projection data set of the number of projection data sets corresponding to a respective source-detector pair of a stationary multi-source tomography system, the first reconstruction stage further configured to reconstruct a first intermediate image based, at least in part, on the group of data frames;

a second reconstruction stage configured to receive a selected data frame from the group of data frames and to reconstruct a second intermediate image based on the selected data frame with a constraint an image space of the first intermediate image as prior; and a refinement stage configured to refine the second intermediate image to produce a three-dimensional output image that corresponds to the dynamic multi-source image.

2. The apparatus of claim 1, further comprising a preprocessing stage configured to arrange at least a portion of the data frames from the group of data frames in a chronological order or an order based on image structural similarity.

3. The apparatus of claim 1, wherein at least one of the first reconstruction stage, the second reconstruction stage and the refinement stage comprises a tensor dictionary.

4. The apparatus of claim 1, wherein training at least one of the first reconstruction stage, the second reconstruction stage or the refinement stage is unsupervised.

5. The apparatus of claim 1, wherein the first reconstruction stage is configured to implement a compressed sensing-based reconstruction, the compressed sensing-based reconstruction accommodating a structure and an intensity of a plurality of different time frames, and wherein the refinement stage is configured to implement a deep prior refinement, the deep prior refinement facilitating removal of residual image artifacts without relying on a ground truth.

6. The apparatus of claim 5, wherein the deep prior refinement is performed based, at least in part, on a deep image prior determined by a deep convolutional network without a ground truth.

7. The apparatus of claim 1, wherein the first reconstruction stage is configured to implement a deep prior prediction, the second reconstruction stage is configured to implement a sparsity group prior reconstruction to provide sparsity regularization, and the refinement stage is configured to implement a temporal sensing reconstruction corresponding to the respective time step of the selected data frame.

8. A method for dynamic multi-source image reconstruction, the dynamic multi-source image corresponding to dynamic computed tomography (CT) imaging captured by using a plurality of source-detector pairs configured to capture projection data, the method comprising:

receiving, by a first reconstruction stage, an input data set comprising a group of data frames, each data frame within the group of data frames corresponding to a respective time step, each data frame within the group of data frames comprising a number of projection data sets, each projection data set within the number of projection data sets corresponding to a respective source-detector pair of a stationary multi-source tomography system;

reconstructing, by the first reconstruction stage, a first intermediate image based, at least in part, on the group of data frames;

receiving, by a second reconstruction stage, a selected data frame;

reconstructing, by the second reconstruction stage, a second intermediate image with a constraint of the first intermediate image as prior; and refining, by a refinement stage, the second intermediate image to produce a three-dimensional output image that corresponds to the dynamic multi-source image.

9. The method of claim 8, further comprising arranging, by a preprocessing stage, at least a portion of the data frames from the group of data frames in a chronological order or an order based on image structural similarity.

10. The method of claim 8, wherein at least one of the first reconstruction stage, the second reconstruction stage and the refinement stage comprises a tensor dictionary.

11. The method of claim 8, wherein training at least one of the first reconstruction stage, the second reconstruction stage or the refinement stage is unsupervised.

12. The method of claim 8, wherein the first reconstruction stage is configured to implement a compressed sensing-based reconstruction accommodating a structure and an intensity of a plurality of different time frames, and wherein the refinement stage is configured to implement a deep prior refinement, the deep prior refinement facilitating removal of residual image artifacts without relying on ground truth.

13. The method of claim 8, wherein the first reconstruction stage is configured to implement a deep prior prediction, the second reconstruction stage is configured to implement a sparsity group prior reconstruction to provide sparsity regularization, and the refinement stage is configured to implement a temporal sensing reconstruction corresponding to the respective time step of the selected data frame.

14. A system for dynamic multi-source image reconstruction, wherein the dynamic multi-source image corresponds to dynamic computed tomography (CT) imaging captured by using a plurality of source-detector pairs configured to capture projection data, the system comprising:

a computing device comprising a processor, a memory, an input/output circuitry, and a data store;

a first reconstruction stage configured to receive an input data set comprising a group of data frames, each data frame within the group of data frames corresponding to a respective time step, each data frame within the group of data frames comprising a number of projection data sets, each projection data set within the number of projection data sets corresponding to a respective source-detector pair of a stationary multi-source tomography system, the first reconstruction stage further configured to reconstruct a first intermediate image based, at least in part, on the group of data frames;

a second reconstruction stage configured to receive a selected data frame from the group of data frames and to reconstruct a second intermediate image based on the selected data frame with a constraint in an image space of the first intermediate image as prior; and a refinement stage configured to refine the second intermediate image to produce a three-dimensional output image that corresponds to the dynamic multi-source image.

15. The system of claim 14, further comprising a preprocessing stage configured to arrange at least a portion of the group of data frames from the group of data frames in a chronological order or an order based on image structural similarity.

16. The system of claim 14, wherein at least one of the first reconstruction stage, the second reconstruction stage and the refinement stage comprises a tensor dictionary.

17. The system of claim 14, wherein training at least one of the first reconstruction stage, the second reconstruction stage or the refinement stage is unsupervised.

18. The system of claim 14, wherein the first reconstruction stage is configured to implement a compressed sensing-based reconstruction, the compressed sensing-based reconstruction accommodating a structure and an intensity of a plurality of different time frames, and wherein the refinement stage is configured to implement a deep prior refinement, the deep prior refinement facilitating removal of residual image artifacts without relying on a ground truth.

19. The system of claims 14, wherein the first reconstruction stage is configured to implement a deep prior prediction, the second reconstruction stage is configured to implement a sparsity group prior reconstruction to provide sparsity regularization, and the refinement stage is configured to implement a temporal sensing reconstruction corresponding to the respective time step of the selected data frame.

20. A computer readable storage device having stored thereon instructions that when executed by one or more processors result in the following operations comprising the method according to claim 8.

* * * * *